US011513792B2

(12) United States Patent
Haster et al.

(10) Patent No.: US 11,513,792 B2
(45) Date of Patent: Nov. 29, 2022

(54) TRACKING HISTORY OF FIRMWARE PROGRAM UPDATES

(71) Applicant: Arm Cloud Technology, Inc., San Jose, CA (US)

(72) Inventors: Christopher Haster, Austin, TX (US); Michael Bartling, Austin, TX (US)

(73) Assignee: Izuma Tech, Inc., Evant, TX (US)

( * ) Notice: Subject to any disclaimer, the term of this patent is extended or adjusted under 35 U.S.C. 154(b) by 0 days.

(21) Appl. No.: 17/038,512

(22) Filed: Sep. 30, 2020

(65) Prior Publication Data

US 2022/0100496 A1 Mar. 31, 2022

(51) Int. Cl.

| | |
|---|---|
| ***G06F 8/71*** | (2018.01) |
| ***G06F 9/54*** | (2006.01) |
| ***G06F 11/34*** | (2006.01) |
| ***G06F 8/54*** | (2018.01) |
| ***G06F 11/30*** | (2006.01) |
| ***G06F 8/65*** | (2018.01) |

(52) U.S. Cl.

CPC .................. *G06F 8/71* (2013.01); *G06F 8/54* (2013.01); *G06F 8/65* (2013.01); *G06F 9/547* (2013.01); *G06F 11/302* (2013.01); *G06F 11/3476* (2013.01)

(58) Field of Classification Search

CPC ..... G06F 8/71; G06F 8/54; G06F 8/65; G06F 9/547; G06F 11/302; G06F 11/3476

USPC .......................................................... 717/120

See application file for complete search history.

(56) References Cited

U.S. PATENT DOCUMENTS

| | | | | |
|---|---|---|---|---|
| 2009/0100410 | A1* | 4/2009 | Pouliot | G06F 8/75 717/122 |
| 2014/0033165 | A1* | 1/2014 | Hightower | G06F 8/36 717/101 |
| 2018/0088929 | A1* | 3/2018 | Eberlein | G06F 8/65 |

(Continued)

OTHER PUBLICATIONS

Zimmermann, "Mining Workspace Updates in CVS", 2007, [Online], pp. 1-4, [Retrieved from internet on Jul. 7, 2022], <https://ieeexplore.ieee.org/stamp/stamp.jsp?arnumber=4228648> (Year: 2007).*

*Primary Examiner* — S. Sough
*Assistant Examiner* — Zengpu Wei
(74) *Attorney, Agent, or Firm* — Nixon & Vanderhye P.C.

(57) ABSTRACT

A method of tracking a history of firmware program updates. The method includes reading current descriptions of current application programming interfaces from a history log. The current application programming interfaces correspond to current software modules. The current software modules form a current firmware program of a target device. The method also includes accessing updated software modules and new descriptions of new application programming interfaces of an updated firmware program. The updated firmware program is created from the current firmware program. The method further includes appending the new descriptions to the current descriptions in the history log, reading the new descriptions of the new application programming interfaces from the history log, generating an updated linkage for the updated firmware program by adding new links for the new application programming interfaces, and storing the updated software modules and the updated linkage in the history log.

18 Claims, 8 Drawing Sheets

(56) References Cited

U.S. PATENT DOCUMENTS

| | | | | |
|---|---|---|---|---|
| 2019/0146773 | A1* | 5/2019 | Attard | G06F 8/61<br>717/169 |
| 2019/0354363 | A1* | 11/2019 | Nakaguma | H04L 67/34 |
| 2020/0192638 | A1* | 6/2020 | Pezaris | G06F 8/41 |
| 2021/0064364 | A1* | 3/2021 | Culibrk | G06F 8/71 |
| 2021/0216288 | A1* | 7/2021 | Bahrami | G06F 8/36 |
| 2021/0247976 | A1* | 8/2021 | Masis | G06F 8/73 |

* cited by examiner

TRACKING HISTORY OF FIRMWARE PROGRAM UPDATES

INTRODUCTION

Software linkage (coupling of binary application programming interfaces of software modules) is an issue for granular firmware updates. Updating the software linkage often involves error-prone developer intervention, usually without the ability to extend or modify the application programming interfaces of existing software modules once the firmware is deployed in a device that is sent out to the field. As a result, one or more of the links can be broken by a firmware update thereby causing problems with the device operation.

SUMMARY

A method of tracking a history of firmware program updates is provided herein. The method includes reading a plurality of current descriptions of a plurality of current application programming interfaces from a history log. The plurality of current application programming interfaces corresponds to a plurality of current software modules. The plurality of current software modules forms a current firmware program of a target device. The method also includes accessing one or more updated software modules and one or more new descriptions of one or more new application programming interfaces of an updated firmware program. The updated firmware program is created from the current firmware program. The method further includes appending the one or more new descriptions to the plurality of current descriptions in the history log using a processor, reading the one or more new descriptions of the one or more new application programming interfaces from the history log using the processor, generating an updated linkage for the updated firmware program by adding one or more new links for the one or more new application programming interfaces using the processor, and storing the one or more updated software modules and the updated linkage in the history log.

A system is provided herein. The system includes a storage device and a processor. The storage device is configured to store a history log. The processor is coupled to the storage device and is configured to read a plurality of current descriptions of a plurality of current application programming interfaces from the history log. The plurality of current application programming interfaces corresponds to a plurality of current software modules. The plurality of current software modules forms a current firmware program of a target device. The processor is also configured to access one or more updated software modules and one or more new descriptions of one or more new application programming interfaces of an updated firmware program. The updated firmware program is created from the current firmware program. The processor is further configured to append the one or more new descriptions to the plurality of current descriptions in the history log, read the one or more new descriptions of the one or more new application programming interfaces from the history log, generate an updated linkage for the updated firmware program by adding one or more new links for the one or more new application programming interfaces, and store the one or more updated software modules and the updated linkage in the history log.

A non-transitory computer readable storage medium storing instructions that track a history of firmware updates is provided herein. The instructions, when executed by a processor, cause the processor to perform a plurality of operations including reading a plurality of current descriptions of a plurality of current application programming interfaces from a history log. The plurality of current application programming interfaces corresponds to a plurality of current software modules. The plurality of current software modules forms a current firmware program of a target device. The plurality of operations also includes accessing one or more updated software modules and one or more new descriptions of one or more new application programming interfaces of an updated firmware program. The updated firmware program is created from the current firmware program. The plurality of operations further includes appending the one or more new descriptions to the plurality of current descriptions in the history log, reading the one or more new descriptions of the one or more new application programming interfaces from the history log, generating an updated linkage for the updated firmware program by adding one or more new links for the one or more new application programming interfaces, and storing the one or more updated software modules and the updated linkage in the history log.

The above features and advantages and other features and advantages of the present disclosure are readily apparent from the following detailed description of the best modes for carrying out the disclosure when taken in connection with the accompanying drawings.

DETAILED DESCRIPTION

Embodiments of the disclosure generally provide a process and/or a system for maintaining a history of software module linkages that enables granular firmware updates without intervention of a software developer. The disclosure enables tracking of software module histories in such a way that tooling may automatically build linkage suitable to append and modify module application programming interfaces (APIs) without developer intervention.

Figure 1:
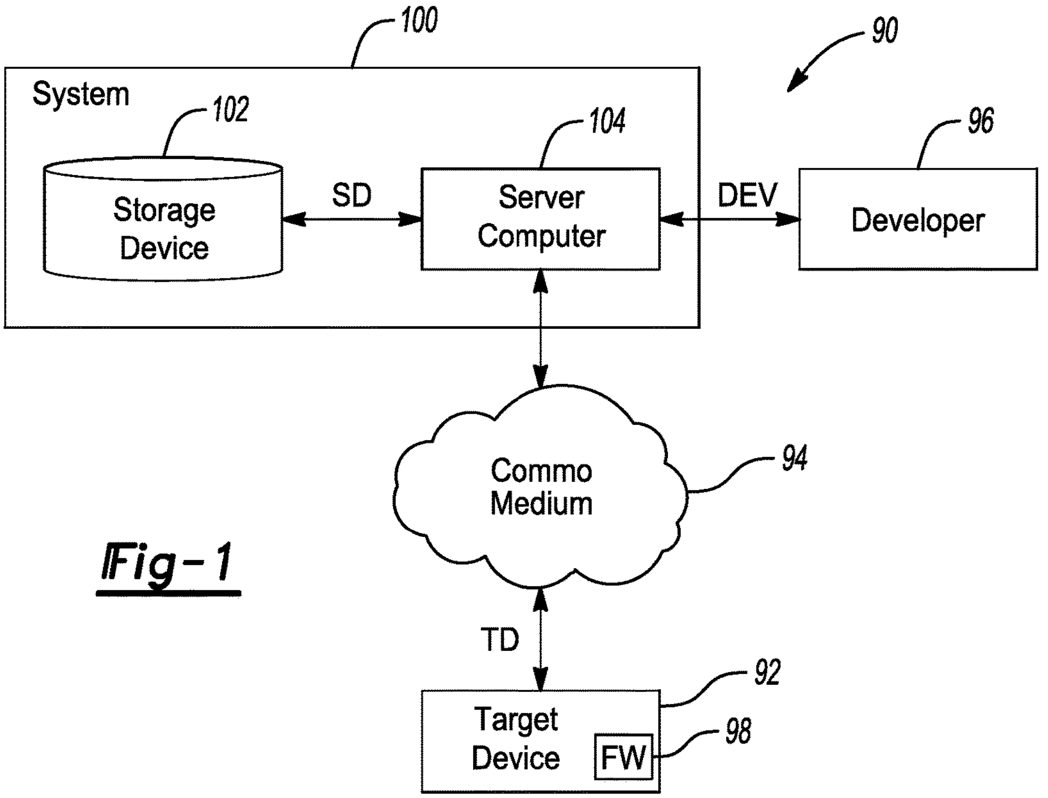
FIG. 1 is a schematic diagram of an environment in accordance with an exemplary embodiment.

Referring to FIG. 1, a schematic diagram of an example implementation of an environment 90 is shown in accordance with an exemplary embodiment. The environment 90 includes a target device 92, a communication medium 94, one or more developers (one shown) 96, and a system 100. The target device 92 may store one or more firmware programs (one shown) 98. The system 100 includes a storage device 102 and a server computer 104.

A developer signal (e.g., DEV) is exchanged between the developer 96 and the server computer 104. The developer signal DEV conveys instructions from the developer 96 to the server computer 104. The developer signal DEV also conveys design information from the server computer 104 to the developer 96. A storage device signal (e.g., SD) is exchanged between the storage device 102 and the server computer 104. The storage device signal SD transfers firmware programming information and commands between the storage device 102 and the server computer 104. A target device signal (e.g., TD) is exchanged between the target device 92 and the server computer 104. The target device signal TD carries firmware updates, status, and instructions between the server computer 104 and the target device 92.

The environment 90 generally establishes a context in which the developer 96 utilizes the system 100 to generate one or more updates for one or more firmware programs 98 for the target device 92. The updates to the firmware programs 98 are delivered (or deployed) to the target device 92 via the communication medium 94.

The target device 92 is implemented as one or more field-programmable devices that are remotely located from the system 100. The target device 92 is operational to perform one or more tasks based on the firmware programs 98 executed therein. The target device 92 is configured such that the firmware programs 98 are updatable from the system 100 via the communication medium 94. In various embodiments, the target device 92 may be a portable device, a fixed-location device, a hand-held device, a computer, a laptop computer, a notepad computer, a cellular telephone, a personal digital assistant, a vehicle, a set-top box, a camera, a phone, or the like. Other target devices 92 may be implemented to meet a design criteria of a particular application.

The communication medium 94 is implemented as one or more digital networks and/or one or more storage elements. The communication medium 94 is generally operational to provide communications between the server computer 104 and the target device 92. For bidirectional communications, the communication medium 94 may include one or more wired networks and/or one or more wireless networks. The communication medium 94 may be implemented as a local area network or a wide area network. The communication medium 94 may include, but is not limited to, an Ethernet network, the Internet, a Universal Serial Bus network, and/or a fiber optic network. Other networks may be implemented to meet the design criteria of a particular application. For directional communications, the communication medium 94 may include a storage device. In various embodiments, the communication medium 94 may be a hard disk drive, a solid state drive, an optical drive, a flash drive, and/or other nonvolatile devices that can carry the firmware program 98 and subsequent updates from the server computer 104 to the target device 92.

The developer 96 is one or more persons (or users) responsible for determining the updates to the firmware programs 98 in the target device 92. The developer 96 interacts with the server computer 104 to create an initial version of the firmware programs 98 and/or generate updates to the firmware programs 98.

The system 100 is implemented as a software build system. The system 100 is operational to interact with the developer 96 to create and/or update the firmware programs 98 in the target device 92. The system 100 is also operational to transfer the updated firmware programs 98 to the target device 92 via the communication medium 94.

The storage device 102 is implemented as one or more mass storage devices. The storage device 102 is operational to store a history log that details a developmental history of the firmware programs 98 created by and/or updated by the system 100. In various embodiments, the storage device 102 includes one or more hard disk drives configured to communicate with the server computer 104 via the storage device signal SD. Other forms of mass storage may be implemented in the storage device 102 to meet a design criteria of a particular application.

The server computer 104 is implemented as one or more computers. The server computer 104 is operational to execute programs to create and edit the firmware programs 98 for the target device 92. In various embodiments, the server computer 104 is a distributed computer system, a cloud-based computer system, a stand-alone computer system, or the like. The server computer 104 communicates with the storage device 102 via the storage device signal SD to send and receive data related to the firmware programs 98. The developer signal DEV is used by the server computer 104 to send and receive data for editing the firmware programs 98. The server computer 104 is also operational to communicate with the target device 92 via the target device signal TD to send the firmware program updates and, optionally, to send the initial firmware program 98 to the target device 92.

The server computer 104 generally creates a storable description of the application programming interfaces that couple the software modules in the target device 92. The representation also stores immutable version information that describes where the application programming interface was added to the system. The version information is able to encode all of patch changes, minor changes (e.g., adding application programming interfaces), and major changes (e.g., removing/modifying application programming interfaces).

A commit tool executing in the server computer 104 appends the descriptions of additional application programming interfaces based on the source code available in a workspace of the developer 96. The developer 96 may specify which functions constitute the application programming interface. Specifying the application programming interface functions may also be accomplished with a manual configuration file and/or by parsing certain source code files. Along with appending the application programming interface description, the commit tool also increments the version information appropriately when executed. Whether or not the version change is a major change, a minor change, or a patch change is automatically deduced by the changes that the developer 96 makes to the application programming interfaces.

Executing the commit tool may be analogous to creating a "commit" in version control software and creating a "release" for consumable software versions. The commit tool does not overwrite the application programming interface descriptions of previous versions in the storage device 102. Instead, the commit tool only appends the updated version to the history log while preserving the history of previous and current application programming interface descriptions.

The server computer 104 also executes a build tool. The build tool generally understands the stored application programming interface descriptions along with the history stored in the history log in order to generate linkage that supports firmware program updates without breaking compatibility. The linkage may allow for the addition of new application programming interfaces. Adding new application programming interfaces is accomplished by an extendable vector of inter-process communications (IPCs), for example, an array of function pointers. Therefore, the linkage appropriate for the firmware updates may be generated automatically with minimal impact. For patch changes, only the impacted modules may be updated. For minor changes, the impacted modules may be updated, and new application programming interfaces may be added. For major changes, the impacted modules and any dependents are also updated. Where a major change occurs, but only the updated module is being updated, the major change may be deferred by duplicating the new logic and the old logic until all dependent modules are also updated.

With the tooling integrated into the system 100, the developer 96 may avoid manual involvement with linkage changes as a part of changing the application programming interfaces during the firmware updates. Instead, the developer 96 may run the tools to commit one or more new application programming interface versions. For added usability, most existing version control software programming generally supports tool integration in the form of what is commonly called a "commit-hook". Adding the tooling as a "commit-hook" generally allows the tooling to run implicitly as a part of a traditional version control commit, and so removing interactions from the developer 96. With the correct configuration, the system 100 may be deployed to a team of developers 96 in order to insure compatible updates of granular firmware without additional developer interaction.

Version information may be configured to identify a number of major changes that have been made in the past, a number of minor changes that have taken place since the last major change, and a number of patch changes since the most recent major change and/or most recent minor change. Patch changes are changes that alter current software modules but do not affect current application programming interfaces. Corrections of bugs are examples of patch changes. Notation of a patch change may be from a current version (e.g., v1.0.0) to an updated version (e.g., v1.0.1).

Minor changes modify current software modules and add new application programming interfaces, but do not modify existing application programming interfaces. A minor change is a special case of application programming interface change that may be accomplished without breaking backwards compatibility. Current software modules that are dependent on the new application programming interface are changed, but the current software modules that are dependent on unrelated application programming interfaces are not changed. Note that the developer 96 may add a "fixed" version of an application programming interface to provide a fix without causing a major version change. Such fixes may be cleaned up on the next major version change. An example notation of a minor change may be from a current version (e.g., v1.0.0) to an updated version (e.g., v1.1.0). Another example indication of a minor change may be from a current version (e.g., v1.2.4) to the updated version (e.g., 1.3.0) that resets the patch change count (e.g., "4" resets to "0").

Major changes are changes that modify existing (current) application programming interfaces that result in updates of dependent modules. An example notation of a major change may be from a current version (e.g., v1.0.0) to an updated version (e.g., v2.0.0). Another example indication of a major change may be from a current version (e.g., v1.2.3) to the updated version (e.g., 2.0.0) that resets the minor change count (e.g., "2" is reset to "0") and resets the patch change count (e.g., "3" is reset to "0").

Multiple (e.g., two) methods for linking may be utilized, jumptable linkage and dynamic linkage. Software modules with jumptable linkage generally contain an array of exported functions. Linking in such cases means that each linked software module uses an offset into the "jumptable" to find a function address being jumped to. An example jumptable of a module may be given by Table I as follows:

TABLE I

| Module 1 | Entries | Offsets |
|---|---|---|
| Entries | &function1 | |
| | &function2 | <– function2 at offset 2 |
| | &function3 | |
| Start of Executables | executable1 | |
| | executable2 | |
| | executable3 | |

Minor updates may be created by appending new jumptable entries. For example, an additional function4 may be incorporated to Table I, as illustrated by Table II as follows. Note that appending does not change the offsets for previous exports:

TABLE II

| Module 1 | Entries | Offsets |
|---|---|---|
| Entries | &function1 | |
| | &function2 | <– function2 at offset 2 |
| | &function3 | |
| | &function4 (new) | |
| Start of Executables | executable1 | |
| | executable2 | |
| | executable3 | |

Major updates may force jumptable entries to move, and dependent modules with offsets are be updated. For example, the function1 entry may be removed to create Table III as follows:

TABLE III

| Module 1 | Entries | Offsets |
|---|---|---|
| Entries | &function2 | <– function2 at offset 1 |
| | &function3 | |
| | &function4 | |
| Start of Executables | executable1 | |
| | executable2 | |
| | executable3 | |

The dynamic linkage is generally efficient at runtime and has the same implications for major/minor updates. For the dynamic linkage, the addresses of the functions are utilized, and at load time, the executable code is modified to use the correct addresses. Table IV illustrates the address of function2 as follows:

TABLE IV

| Module 1 | Entries | Address |
|---|---|---|
| Start of Executables | &function1 | |
| | &function2 | <- function2 at 0x00000020 |
| | &function3 | |

Minor updates may be accomplished by appending new functions. By way of example, Table V shows the addition of function 4 appended after function3 in the table:

TABLE V

| Module 1 | Entries | Address |
|---|---|---|
| Start of Executables | &function1 | |
| | &function2 | <- function2 at 0x00000020 |
| | &function3 | |
| | &function4 (new) | |

Major updates may force the address of the functions to move. Table VI illustrates the removal of function1 and a shifting of the remaining functions as follows:

TABLE VI

| Module 1 | Entries | Address |
|---|---|---|
| Start of Executables | &function2 | <- function2 at 0x00000010 |
| | &function3 | |
| | &function4 | |

The dynamic linkage may become more complicated where patch changes cause a function to increase in size, thereby causing other functions to move. Such situations may be improved by giving the functions some amount of padding to allow for some growth. However, some patch changes may be upgraded to major changes in response to becoming too large.

Figure 2:
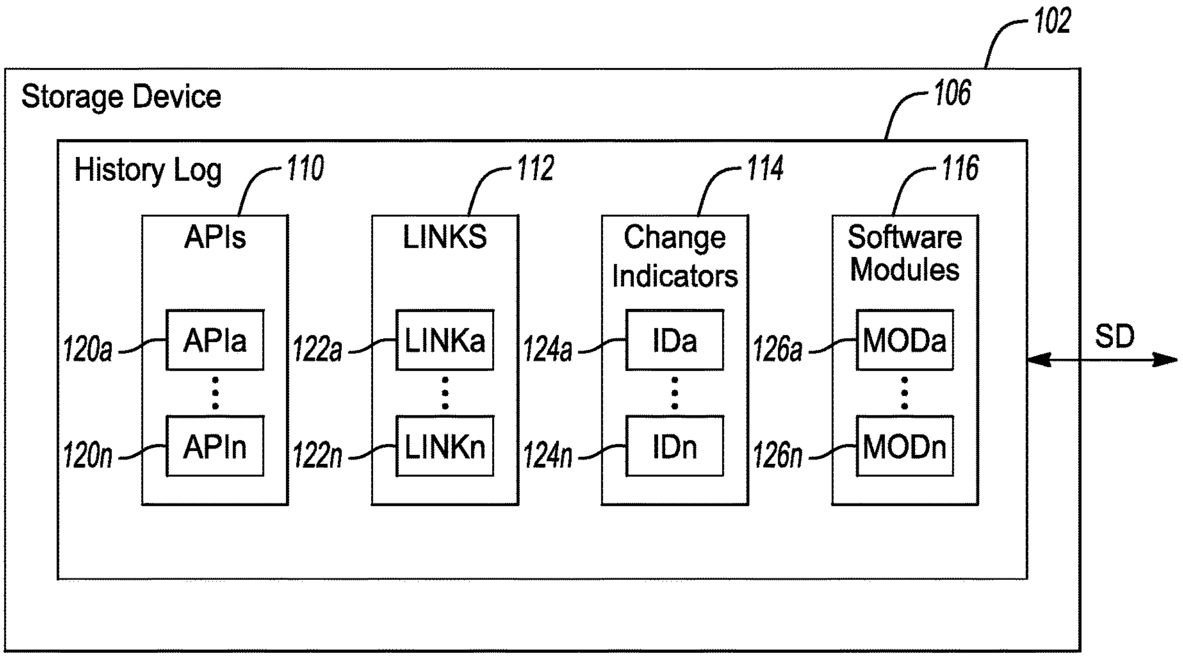
FIG. 2 is a schematic diagram of a storage device in the environment in accordance with an exemplary embodiment.

Referring to FIG. 2, a schematic diagram of an example implementation of the storage device 102 is shown in accordance with an exemplary embodiment. The storage device 102 is configured to store a history log 106. The history log 106 contains data for an application programming interface history 110, a link history 112, a change indicator history 114, and a software module history 116. The server computer 104 is operational to read from and write to the history log 106 via the storage device signal SD.

The application programming interface history 110 includes multiple entries for various versions of application programming interfaces 120*a*-120*n*. Several (e.g., three) application programming interfaces (e.g., 120*a*-120*c*) may form an initial set of application programming interfaces for an initial version of the firmware programs 98. Subsequent application programming interfaces (e.g., 120*d*-120*n*) may be appended to the history log 106 as the firmware programs 98 are updated. Note that the existing application programming interfaces 120*a*-120*c* are preserved as the subsequent application programming interfaces 120*d*-120*n* are appended to the history log 106.

The link history 112 includes multiple entries for multiple versions of links 122*a*-122*n*. Several links (e.g., 122*a*-122*c*) may be an initial set of links for the initial set of application programming interfaces 120*a*-120*c*. Subsequent links (e.g., 122*d*-122*n*) may be appended to the history log 106 as the application programming interfaces 120*a*-120*n* are updated. The existing links 122*a*-122*c* are also preserved as the subsequent links 122*d*-122*n* are appended to the history log 106.

The change indicator history 114 includes entries for multiple change indicators 124*a*-124*n*. The multiple change indicators (e.g., 124*a*-124*c*) generally define version values for the initial set of software modules (e.g., 126*a*-126*n*). Subsequent change indicators (e.g., 124*d*-124*n*) may be appended to the history log 106 as the software modules 126*c*-126*n* are updated. The existing change indicators 124*a*-124*c* are preserved as the subsequent change indicators 124*d*-124*n* are added to the history log 106.

The software module history 116 includes multiple software modules 126*a*-126*n*. Some of the software modules (e.g., 126*a*-126*c*) may form the initial firmware programs 98 of the target device 92. As the software modules are updated (e.g., 126*d*-126*n*), the updated software modules 126*d*-126*n* are appended to the history log 106. The existing software modules 126*a*-126*c* are preserved in response to the subsequent software modules 126*d*-126*n* being appended to the history log 106.

Figure 3:
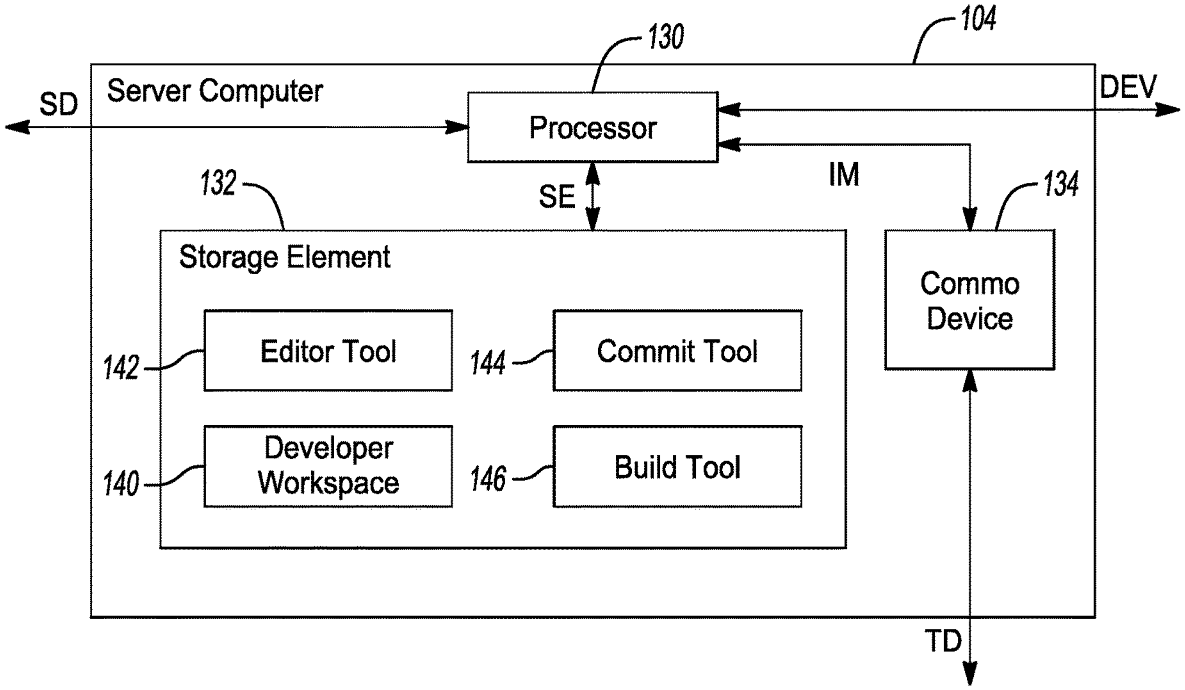
FIG. 3 is a schematic diagram of a server computer in accordance with an exemplary embodiment.

Referring to FIG. 3, a schematic diagram of an example implementation of the server computer 104 is shown in accordance with an exemplary embodiment. The server computer 104 includes a processor 130, a storage element 132, and a communication device 134. The storage device signal SD may be exchanged with the processor 130. The developer signal DEV may be exchanged with the processor 130. The communication device 134 may exchange the target device signal TD with the target device 92. A storage element signal (e.g., SE) is exchanged between the processor 130 and the storage element 132. The storage element signal SE provides programs and data to the processor 130, and receives data for storage in storage element 132. An intermediate signal (e.g., IM) is exchanged between the processor 130 and the communication device 134. The intermediate signal IM generally conveys the same data and firmware information inside the server computer 104 that is conveyed outside the server computer 104 in the target device signal TD.

The processor 130 may be implemented as one or more processors. The processor 130 is operational to read multiple current descriptions of multiple current application programming interfaces from the history log, access one or more updated software modules and one or more new descriptions of one or more new application programming interfaces of an updated firmware program, append the new descriptions to the current descriptions in the history log, read the new descriptions of the new application programming interfaces from the history log, generate an updated linkage for the updated firmware program by adding one or more new links for the new application programming interfaces, and store the updated software modules and the updated linkage in the history log. The current application programming interfaces correspond to multiple software modules. The current software modules form a current firmware program of the target device 92. The updated firmware program is created from the current firmware program.

The storage element 132 is implemented as a local storage within the server computer 104. The storage element 132 is operational to store programs and data for the development and/or updating of the firmware programs 98. The storage element 132 communicates with the processor 130 through the storage element signal SE. In various embodiments, the storage element 132 defines a developer workspace 140. The storage element 132 also stores an editor tool 142, a commit tool 144, and a build tool 146.

The communication device 134 is implemented as a transceiver circuit and/or a media writer circuit. The communication device 134 is operational to transfer firmware and data between the processor 130 and the target device 92. The communication device 134 is in communication with the processor 130 via the intermediate signal IM. The communication device 134 is in communication with the target device 92 via the target device signal TD conveyed through the communication medium 94. Where the communication medium 94 is a network, the communication device 134 is configured to transmit and receive the firmware and data. Where the communication medium 94 is a storage device, the communication device 134 is configured to write the firmware and data into the storage device.

The developer workspace 140 is implemented as a storage space reserved within the storage element 132. The developer workspace 140 is operational to hold data used by the developer 96 while the firmware programs 98 are updated.

The editor tool 142 is implemented as one or more file editors. The editor tool 142 is operational to provide manual changes and/or automatic changes to the entries **120*a*-126*n* in the history log 106**.

The commit tool 144 is operational to look at each software module and application programming interface, and decide where the change is a major change, a minor change, or a patch change. The commit tool 144 writes the major/minor/patch type of change into the change indicator history 114 within the history log 106.

The build tool 146 is operational to compare two points in the history log 106 (usually a current build versus a previous build). Based on the two points in history, the build tool 146 decides what modules are to be updated, and what changes are to be made to the linkage.

Figure 4:
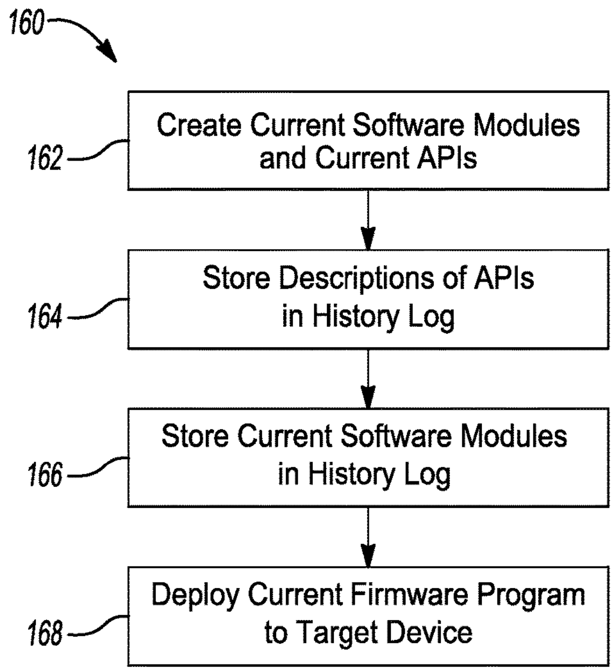
FIG. 4 is a flow diagram of a method for creating an initial firmware program in accordance with an exemplary embodiment.

Referring to FIG. 4, a flow diagram of an example method 160 for creating an initial firmware program 98 is shown in accordance with an exemplary embodiment. The method (or process) 160 is implemented within the environment 90. The method 160 includes a step 162, a step 164, a step 166, and a step 168. The sequence of steps is shown as a representative example. Other step orders may be implemented to meet the criteria of a particular application.

In the step 162, the developer 96 creates the initial software modules **126*a*-126*n* and the initial application programming interfaces 120*a*-120*n* within the developer workspace 140. Descriptions of the application programming interfaces 120*a*-120*n* are stored in the history log 106 in the step 164. The initial software modules 126*a*-126*n* that form the initial firmware program 98 are stored in the history log 106 in the step 166. In the step 168, the initial software modules 126*a*-126*n* are linked by the server computer 104 to create the initial firmware program 98, and subsequently deployed to the target device 92 via the communication medium 94**.

Figure 5:
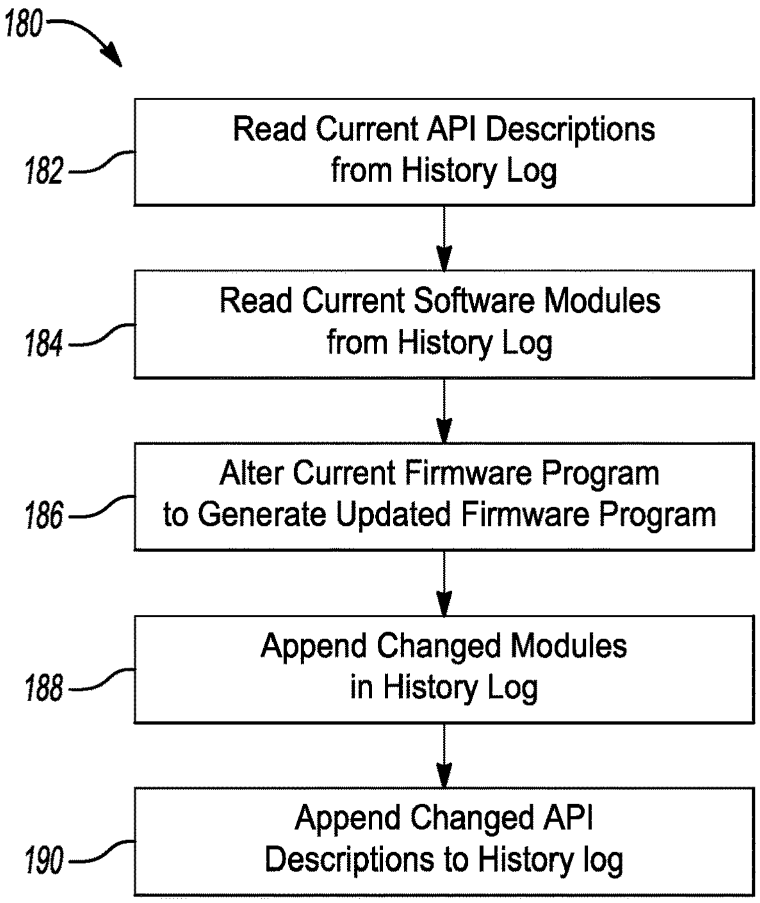
FIG. 5 is a flow diagram of a method for updating the firmware program in accordance with an exemplary embodiment.

Referring to FIG. 5, a flow diagram of an example method 180 for updating the firmware program 98 is shown in accordance with an exemplary embodiment. The method (or process) 180 is implemented by the system 100. The method 180 includes a step 182, a step 184, a step 186, a step 188, and a step 190. The sequence of steps is shown as a representative example. Other step orders may be implemented to meet the criteria of a particular application. The updating may be applied to the initial firmware program 98 and/or a previously-updated version of the firmware program 98.

The descriptions of the current application programming interfaces **120*a*-120*n* are read from the history log 106 in the step 182 by the server computer 104. The current software modules 126*a*-126*n* are read from the history log 106 by the server computer 104 in the step 184. The developer 96 may alter one or more of the current application programming interfaces 120*a*-120*n* and/or one or more of the current software modules 126*a*-126*n* in the step 186 using the server computer 104 to update the firmware program 98. The software modules 126*a*-126*n* that were changed as part of the firmware update are appended to the history log 106 in the step 188. The appending step preserves the older versions of the software modules 126*a*-126*n* within the history log 106. The application programming interfaces 120*a*-120*n* that were changes as part of the firmware update are appended to the history log 106 in the step 190. Older versions of the application programming interfaces 120*a*-120*n* are maintained in the history log 106**.

Figure 6:
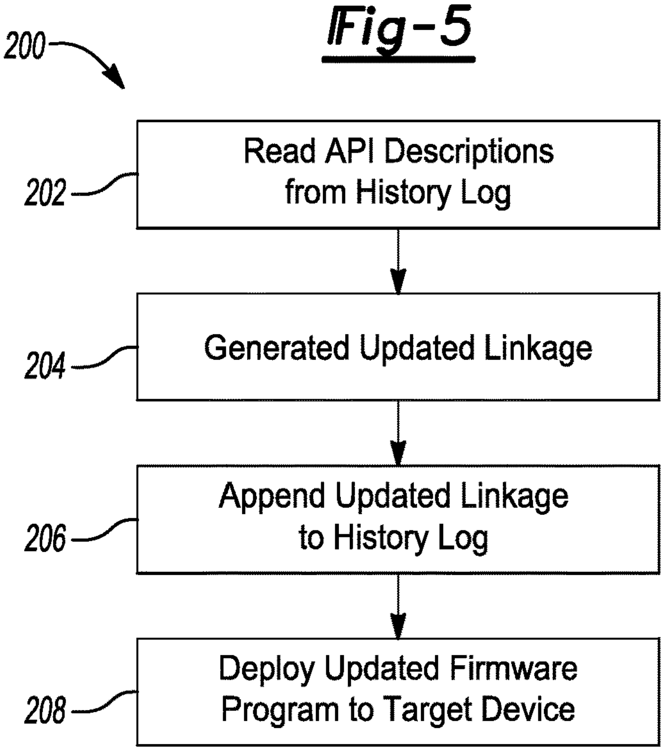
FIG. 6 is a flow diagram of a method for updating software module linkage in accordance with an exemplary embodiment.

Referring to FIG. 6, a flow diagram of an example method 200 for updating the linkage is shown in accordance with an exemplary embodiment. The method (or process) 200 is implemented within the environment 90. The method 200 includes a step 202, a step 204, a step 206, and a step 208. The sequence of steps is shown as a representative example. Other step orders may be implemented to meet the criteria of a particular application.

In the step 202, the server computer 104 reads the application programming interfaces **120*a*-120*n* from the history log 106. Updated linkage that accounts for changes in the application programming interfaces 120*a*-120*n* is generated in the step 204 by the server computer 104. In the step 206, the updated links 122*a*-122*n* are appended to the history log 106. The server computer 104 utilizes the updated links 122*a*-122*n* in the step 208 to update the firmware program 98, which is then deployed to the target device 92**.

Figure 7:
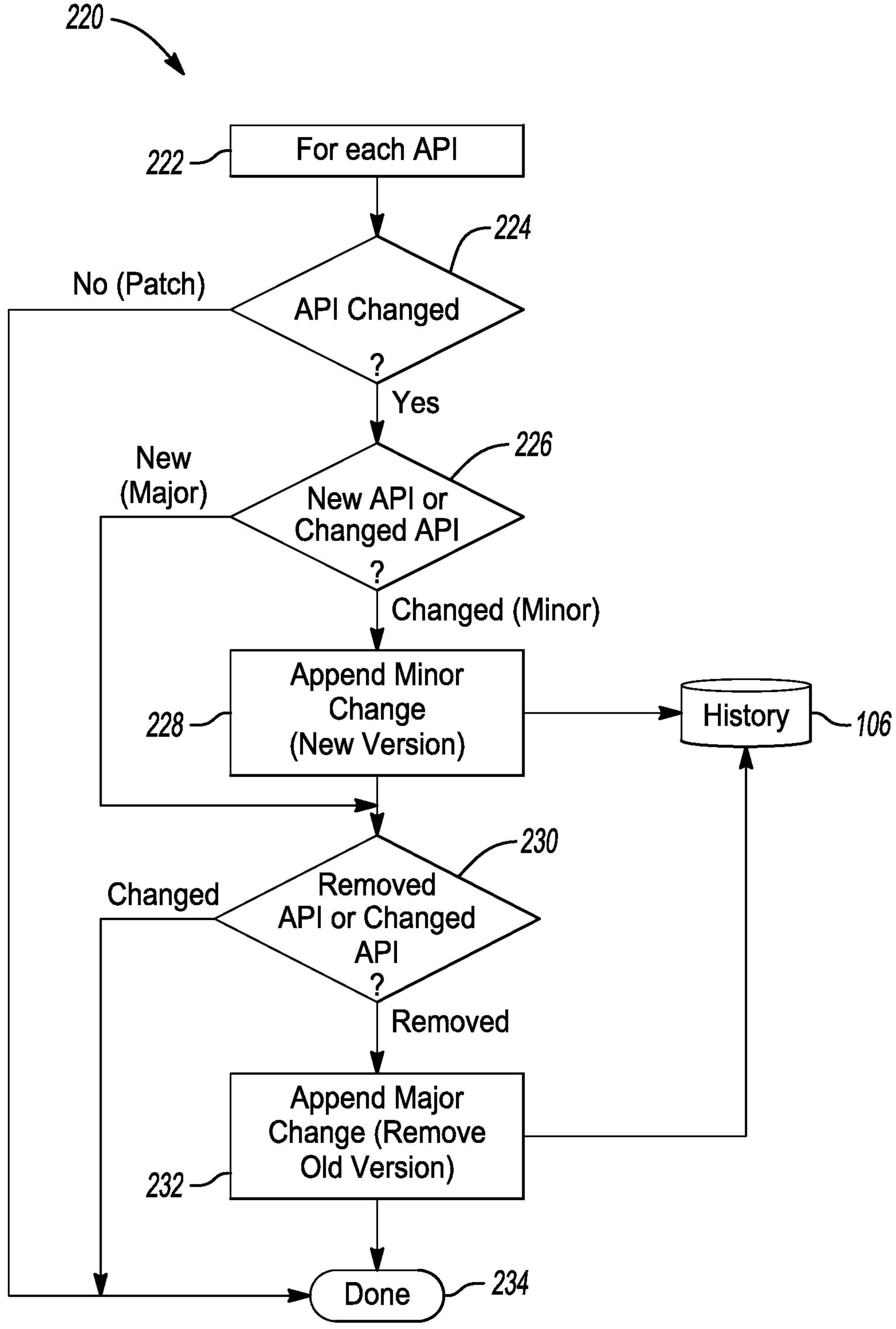
FIG. 7 is a flow diagram of a method of operation for a commit tool in accordance with an exemplary embodiment.

Referring to FIG. 7, a flow diagram of an example method 220 of operation for the commit tool 144 is shown in accordance with an exemplary embodiment. The method (or process) 220 is implemented within the system 100. The method 220 includes a step 222, a step 224, a step 226, a step 228, a step 230, a step 232, and a step 234. The sequence of steps is shown as a representative example. Other step orders may be implemented to meet the criteria of a particular application.

The commit tool 144 is responsible for looking at each software module (e.g., **126*a*-126*e*) and each application programming interface (e.g., 120*a*-120*e*) involved in the update of the firmware program 98 and determining where changes have taken place and where no changes have occurred. Where a change has taken place, a determination is made among a major change, a minor change, or a patch change. The commit tool 144 writes the determination into the history log 106 (e.g., the change indicators 124*a*-124*n*). Much of the work for applying the linkage is done with the build tool 146**.

The commit tool 144 may begin by considering, one at a time, each application programming interface **120*a*-120*e* of the current firmware program 98 as loaded from the history log 106 in the step 222. In the step 224, the commit tool 144 determines whether or not the application programming interface 120*a*-120*e* being considered (e.g., application programming interface 120*a*) has been changed. Where the application programming interface 120*a* under consideration has not changed (e.g., the update is a patch update and/or no change has taken place to the application programming interface 120*a*), the method 220 may finish processing the application programming interface 120***a* with the step 230. The commit tool 144 then considers the next application programming interface 120*b*-120*e* in the firmware program 98 and repeats the method 220.

Where the application programming interface 120*a* under consideration has been changed, a determination may be made in the step 226 to distinguish a minor change from a major change. For a minor change, the commit tool 144 appends the minor change into the history log 106 (e.g., writes the new version of the application programming interface 120*a* as a new application programming interface 120*f*) and appends the corresponding change indicator (e.g., 124*f*) into the history log 106 in the step 228. The method 220 subsequently continues with the step 230. Where the commit tool 144 has determined that the change is a minor change, the step 230 sends the flow to the step 234 where consideration of the application programming interface 120*a* is finished.

For a major change at the step 230, the commit tool 144 appends an obsolete description of an obsolete application programming interface (e.g., 120*g*) and a corresponding change indicator (e.g., 124*g*) into the current descriptions in the history log 106 in the step 232. The obsolete application programming interface 120*g* is one of the current application programming interfaces 120*a*-120*n* removed while generating the updated firmware program from the current firmware program 98. By appending the obsolete description of the obsolete application programming interface 120*g*, instead of removing the description of the obsolete application programming interface 120*a*, the description of the application programming interface 120*a* prior to the major change is preserved in the history log 106. Therefore, the developer 96 may easily revert back to the older version of the application programming interface 120*a* when desired. Consideration of the application programming interface 120*a* is subsequently finished in the step 234.

Figure 8:
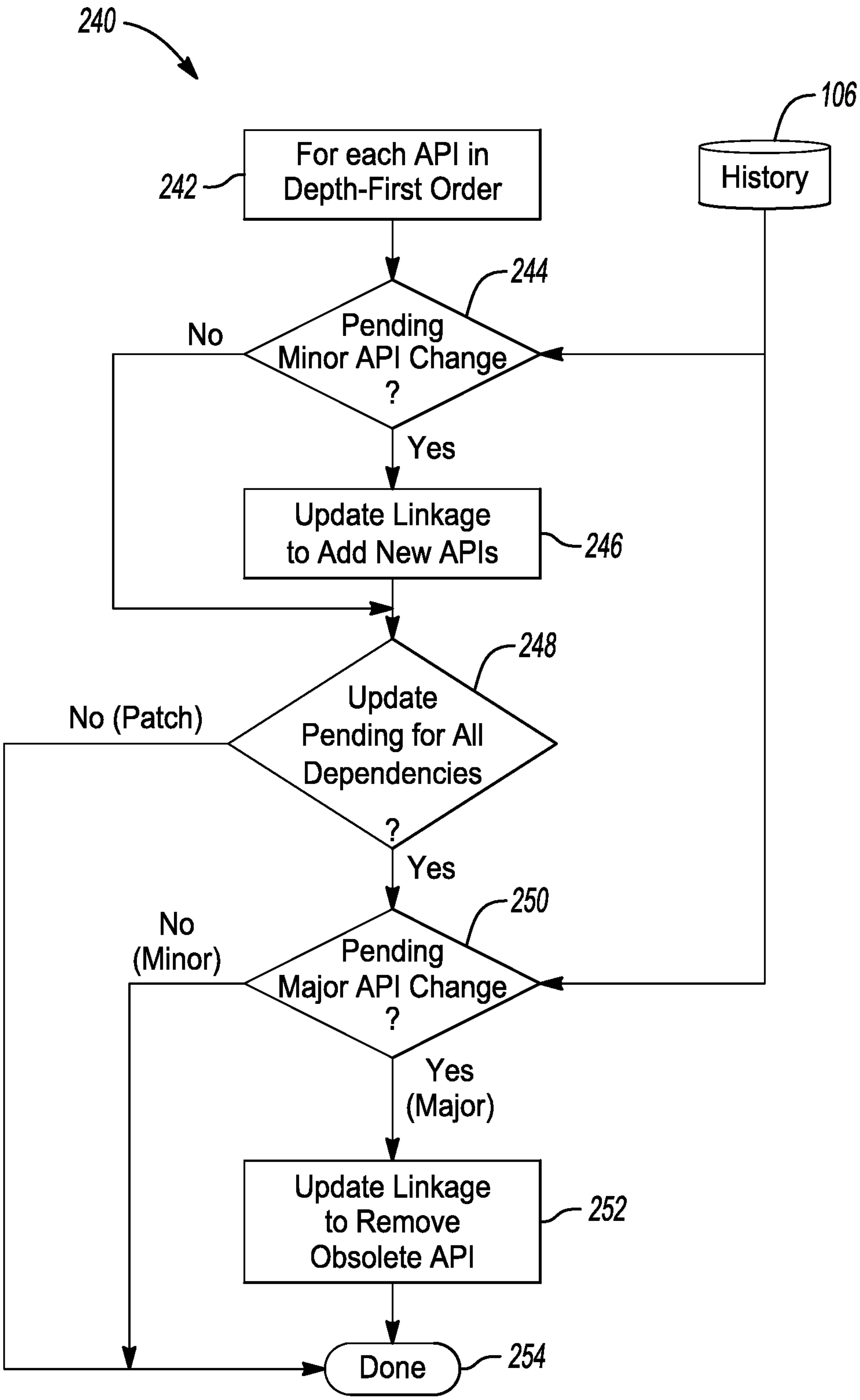
FIG. 8 is a flow diagram of a method of operation for a build tool in accordance with an exemplary embodiment.

Referring to FIG. 8, a flow diagram of an example method 240 of operation for the build tool 146 is shown in accordance with an exemplary embodiment. The method (or process) 240 is implemented within the system 100. The method 240 includes a step 242, a step 244, a step 246, a step 248, a step 250, a step 252, and a step 254. The sequence of steps is shown as a representative example. Other step orders may be implemented to meet the criteria of a particular application.

The build tool 146 is responsible for comparing two points in the history (usually the current build versus a previous build), and decide which software modules should be updated and what linkage should be changed. The build tool 146 may begin by considering, one at a time in a depth-first order, each application programming interface (e.g., 120*a*-120*g*) as loaded from the history log 106 in the step 242. In the step 244, the build tool 146 checks for a pending minor change of the application programming interface (e.g., 120*f*) currently under consideration. Where the application programming interface 120*f* has a minor change, the build tool 146 updates the linkage to add new application programming interfaces in the step 246. Thereafter, the method 240 continues with the step 248. Where the application programming interface 120*f* has other than a minor change, the method 240 continues directly from the step 244 to the step 248.

In the step 248, a check is performed to determine where dependencies should be updated for the application programming interface 120*f* Where no dependencies exist (e.g., the change is a patch), consideration of the current application programming interface 120*f* finishes in the step 254. Where one or more dependencies should be updated, the build tool 146 determines the change to be a minor change or a major change in the step 250. For minor changes, the linkage was already updated in the step 246, so the method 240 finishes with the current application programming interface 120*f* in the step 254. For major changes, the build tool 146 updates the effected linkage to account for the removal of the obsolete application programming interface (e.g., 120*d*) that was replaced by the application programming interface 120*f* Thereafter, the build tool 146 finishes with the application programming interface 120*f* under consideration and a next application programming interface (e.g., 120*g*) is considered.

The following is an example history file (e.g., history-.toml) that may be used by the build tool 146. In various embodiments, the history file may be auto-generated by the commit tool 144. Furthermore, the history file may also be edited by the developer 96 for corner cases that the tools do not cover.

A hash is generally used to ensure synchronization. A warning may be provided to the developer 96 where changes are not in synchronization. An example hash value is Hash='7e110b44c0e796dc56e2fe86587762d685653029' (hexadecimal).

The software modules 126*a*-126*n* may be tracked with a versioning scheme. The versioning scheme is usually internal to the commit tool 144 and not tied to the version that the developer 96 may use. Examples of the module versions is provided as follows:

Add_module.module1={version='v1.0.0'}

Add_module.module2={version='v1.0.0'}

Add_module.module3={version='v1.0.0'}

Add_module.module4={version='v1.0.0'}

Linkages between modules and a linkage type are also tracked. From the changes to the linkage type, major/minor/patch changes may be inferred in many cases.

Add_link.fn1={export='module1', import='module2', type='fn(i32)→i32'}

Add_link.fn2={export='module1', import='module3', type='fn(i32)→i32'}

Add_link.fn3={export='module2', import='module4', type='fn(i32)→i32'}

Add_link.fn4={export='module3', import='module4', type='fn(i32)→i32'}

The following is an example of a patch change where no application programming interfaces 120*a*-120*n* are changed.

Hash='7f7b7332e3a356587b814ceebf23a8e68f06da9e'.

Update_module.module1={version="v1.0.1"} # note the patch version number (e.g., the right number) has changed.

The following is an example of a minor change where current application programming interfaces 120*a*-120*n* are not changed, but one or more new application programming interfaces may be added. Software module dependencies should be updated in response to the minor change. In some situations, the updates may be patch changes. Such rippling of changes in the dependencies is inferred by the build tool 146 and applied automatically.

Hash='d3a2cf48d449f259bc15a3a1058323132f3eeef7'.

Add_link.fn5={export='module1', import='module2', type='fn(i32)→i32' }.

Update_module.module1={version='v1.1.0'} # note the minor version number (e.g., the middle number) has changed.

Update_module.module2={version='v1.0.1'} # module2 is dependent and should be changed, possibly a patch change.

The following is an example of a major change.

Hash='22b04566231c007a1687f4816bd0e9841ce432de'.

Update_link.fn1={export='module1', import='module2', type='fn(i64)→i64' }.

Update_module.module1={version='v2.0.0'} # note the major version number (e.g., left number) has changed.

Update_module.module2={version='v1.0.2'} # module2 is dependent and is changed with a patch change.

Update_module.module3={version='v1.0.1'} # module3 is dependent solely on the module and so is updated. Because major changes may move functions in the software modules, the linked address should also be changed.

In various embodiments, the commit metadata in the history log 106 is append-only. Therefore, a previous history is maintained in the history log 106 allowing the build tool 146 to reconstruct linkage changes that preserve the history of updates on the target device 92. The build tool 146 then has enough information to determine that a set of updates has valid linkage or invalid linkage.

By way of example, consider an update from a first hash='7f7b7332e3a356587b814ceebf23a8e68f06da9e' to a second hash='22b04566231c007a1687f4816bd0e9841ce432de'. The build tool 146 may parse the file up to both of the hashes and build the internal representations.

The metadata at the first hash may be:

```
modules = {
    module1 = { version = 'v1.0.1' }
    module2 = { version = 'v1.0.0' }
    module3 = { version = 'v1.0.0' }
    module4 = { version = 'v1.0.0' }
}
links = {
    fn1 = { export = 'module1', import = 'module2', type = 'fn(i32) -> i32' }
    fn2 = { export = 'module1', import = 'module3', type = 'fn(i32) -> i32' }
    fn3 = { export = 'module2', import = 'module4', type = 'fn(i32) -> i32' }
    fn4 = { export = 'module3', import = 'module4', type = 'fn(i32) -> i32' }
}
```

The metadata at the second hash may be:

```
modules = {
    module1 = { version = 'v2.0.0' }
    module2 = { version = 'v1.0.2' }
    module3 = { version = 'v1.0.1' }
    module4 = { version = 'v1.0.0' }
}
links = {
    fn1 = { export = 'module1', import = 'module2', type = 'fn(i64) -> i64' }
    fn2 = { export = 'module1', import = 'module3', type = 'fn(i32) -> i32' }
    fn3 = { export = 'module2', import = 'module4', type = 'fn(i32) -> i32' }
    fn4 = { export = 'module3', import = 'module4', type = 'fn(i32) -> i32' }
    fn5 = { export = 'module1', import = 'module2', type = 'fn(i32) -> i32' }
}
```

The build tool 146 generally compares the two internal representations, and subsequently creates a set of modules that should be updated to get from the first hash to the second hash without breaking the linkage:

```
should_be_updated = {
    module1 = { before = 'v1.0.1', after = 'v2.0.0', type = 'major update' }
    module2 = { before = 'v1.0.0', after = 'v1.0.1', type = 'patch update' }
    module3 = { before = 'v1.0.0', after = 'v1.0.2', type = 'patch update' }
}
```

Figure 9:
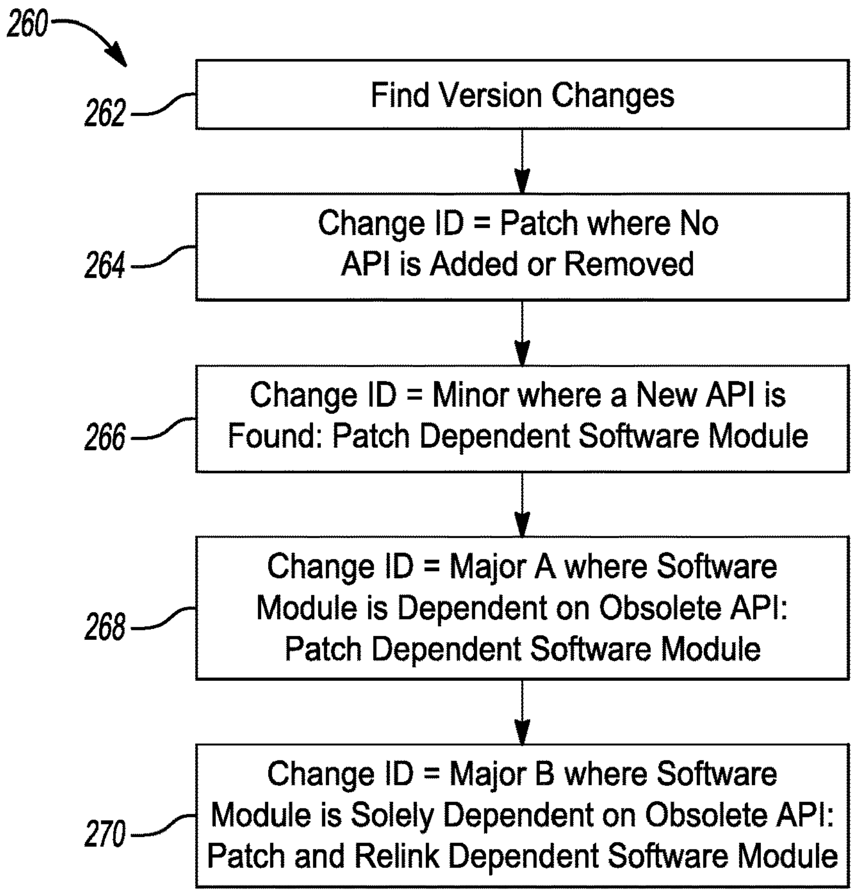
FIG. 9 is a flow diagram of a method for generating change indicators in accordance with an exemplary embodiment.

Referring to FIG. 9, a flow diagram of an example method 260 for generating the change indicators is shown in accordance with an exemplary embodiment. The method (or process) 260 is implemented within the system 100. The method 260 includes a step 262, a step 264, a step 266, a step 268, and a step 270. The sequence of steps is shown as a representative example. Other step orders may be implemented to meet the criteria of a particular application.

In the step 262, the server computer 104 may find version changes in the application programming interfaces **120*a*-120*n* and the software modules 126*a*-126*n*. For changes where no application programming interfaces 120*a*-120*n* are added or removed, the corresponding change indicators 124*a*-124*n* may be set as patch changes in the step 264. For changes where new application programming interfaces 120*a*-120*n* are found, the corresponding change indicators 124*a*-124*n* may be set as minor changes in the step 266. Software modules 126*a*-126*n* that are dependent on the minor-changed application programming interfaces 120*a*-120*n* are patched. For the software modules 126*a*-126*n* that are dependent on obsolete application programming interfaces 120*a*-120*n*, the corresponding change indicators 124*a*-124*n* may be set as a major "A" type of change in the step 268. For major A type changes, the dependent software modules 126*a*-126*n* are patched. Where software modules 126*a*-126*n* are solely dependent on an obsolete application programming interface 120*a*-120*n*, the corresponding change indicators 124*a*-124*n* may be set as a major "B" type of change in the step 270. For major B type changes, the dependent software modules 126*a*-126*n*** are patched and relinked.

Figure 10:
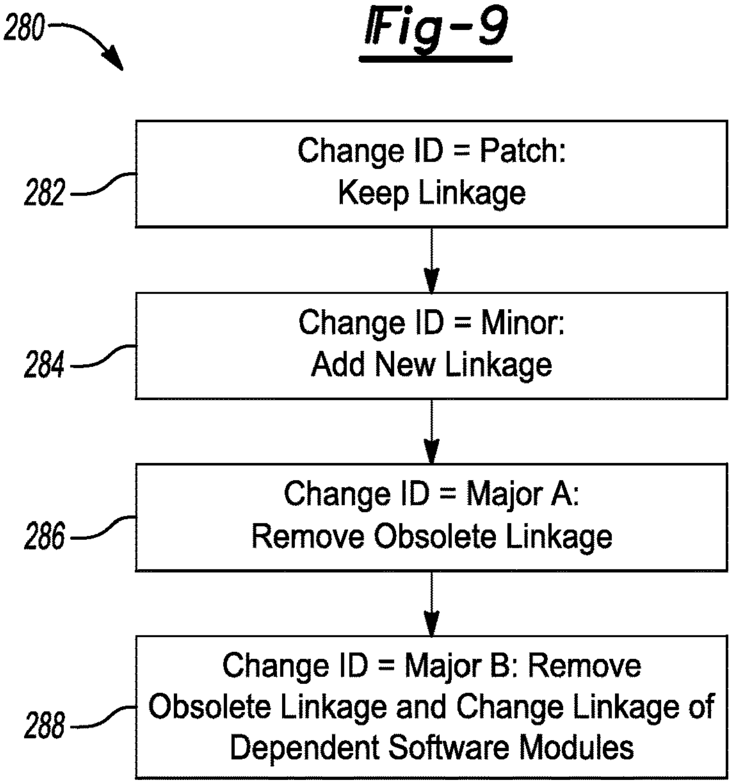
FIG. 10 is a flow diagram of a method for utilizing the change indicators to update linkage in accordance with an exemplary embodiment.

Referring to FIG. 10, a flow diagram of an example method 280 for utilizing the change indicators to update the linkage is shown in accordance with an exemplary embodiment. The method (or process) 280 is implemented in the system 100. The method 280 includes a step 282, a step 284, a step 286, and a step 288. The sequence of steps is shown as a representative example. Other step orders may be implemented to meet the criteria of a particular application.

In the step 282, for change indicators 124*a*-124*n* that indicate the patch type of changes, the corresponding links 122*a*-122*n* for the software modules 126*a*-126*n* may be preserved without change. For change indicators 124*a*-124*n* that indicate the minor type of changes, new links 122*a*-122*n* may be added to the firmware program 98 in the step 284. For change indicators 124*a*-124*n* that indicate the major A type of changes, obsolete links 122*a*-122*n* are removed from the firmware program 98 in the step 286. For change indicators 124*a*-124*n* that indicate the major B type of changes, the obsolete links 122*a*-122*n* may be removed and the linkage of the dependent software modules 126*a*-126*n* may be updated by the server computer 104 in the step 288.

Figure 11:
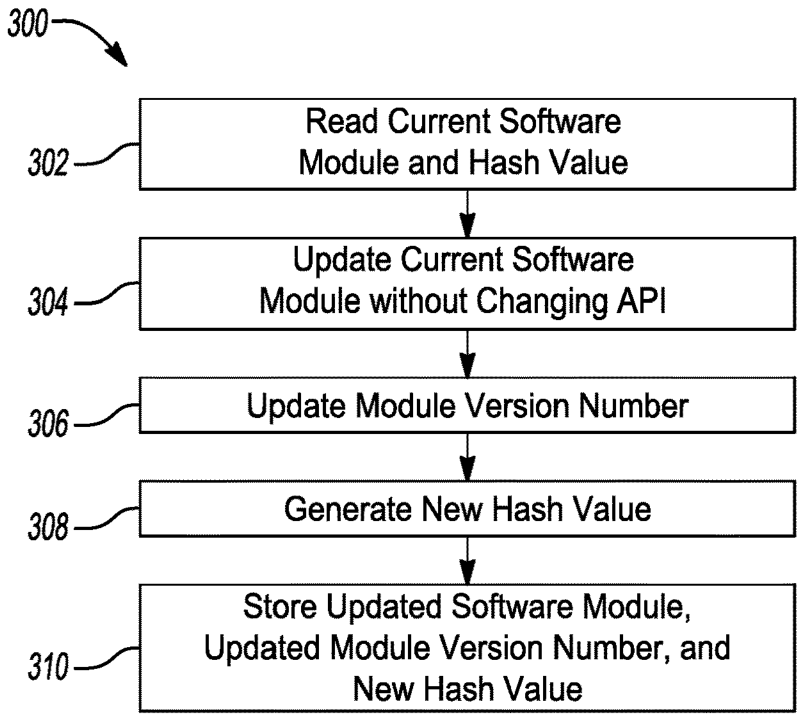
FIG. 11 is a flow diagram of a method for processing a patch change in accordance with an exemplary embodiment.

Referring to FIG. 11, a flow diagram of an example method 300 for processing a patch change is shown in accordance with an exemplary embodiment. The method (or process) 300 is implemented in the system 100. The method 300 includes a step 302, a step 304, a step 306, a step 308, and a step 310. The sequence of steps is shown as a representative example. Other step orders may be implemented to meet the criteria of a particular application.

The server computer 104 may read from the history log 106 the current software modules 126*a*-126*n* of the firmware program 98 presently installed in the target device 92 in the step 302. In the step 304, the developer 96 may patch a particular one of more of the software modules 126*a*-126*n* without changing the corresponding application programming interfaces 120*a*-120*n*. The version numbers of the patched software modules 126*a*-126*n* are automatically updated in the step 306. New hash values are generated by the server computer 104 in the step 308. In the step 310, the updated software modules 126*a*-126*n*, the updated version numbers, and the new hash values are stored by appending the data into the history log 106.

Figure 12:
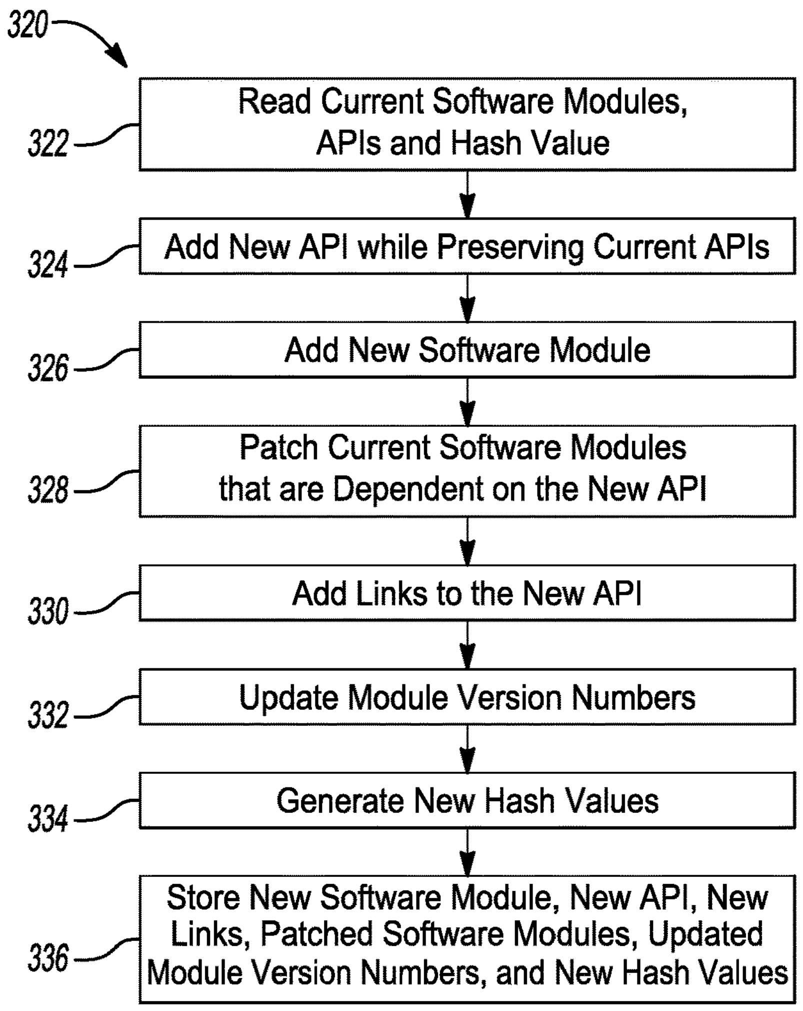
FIG. 12 is a flow diagram of a method for processing a minor change in accordance with an exemplary embodiment.

Referring to FIG. 12, a flow diagram of an example method 320 for processing a minor change is shown in accordance with an exemplary embodiment. The method (or process) 320 is implemented in the system 100. The method 320 includes a step 322, a step 324, a step 326, a step 328, a step 330, a step 332, a step 334, and a step 336. The sequence of steps is shown as a representative example. Other step orders may be implemented to meet the criteria of a particular application.

In the step 322, the server computer 104 reads from the history log 106 the current software modules 126*a*-126*n*, the current application programming interfaces 120*a*-120*n*, and the hash value of the firmware program 98 currently installed in the target device 92. New application programming interfaces 120*a*-120*n* may be added to the firmware program 98 in the step 324. The existing application programming interfaces 120*a*-120*n* in the firmware program 98 are preserved while the new application programming interfaces 120*a*-120*n* are added. One or more new software modules 126*a*-126*n* may be added to the firmware program 98 in the step 326.

In the step 328, current software modules 126*a*-126*n* that are dependent on the new application programming interfaces 120*a*-120*n* may be patched by the developer 96. Links 122*a*-122*n* are automatically added to the new application programming interfaces 120*a*-120*n* in the step 330 by the server computer 104. The version numbers are updated in the step 332. A new hash value is generated in the step 334. Thereafter, the new/patched software modules 126*a*-126*n*, the new application programming interfaces 120*a*-120*n*, the new links 122*a*-122*n*, the updated version numbers, and the new hash value are stored by appending the data to the history log 106 in the step 336.

Figure 13:
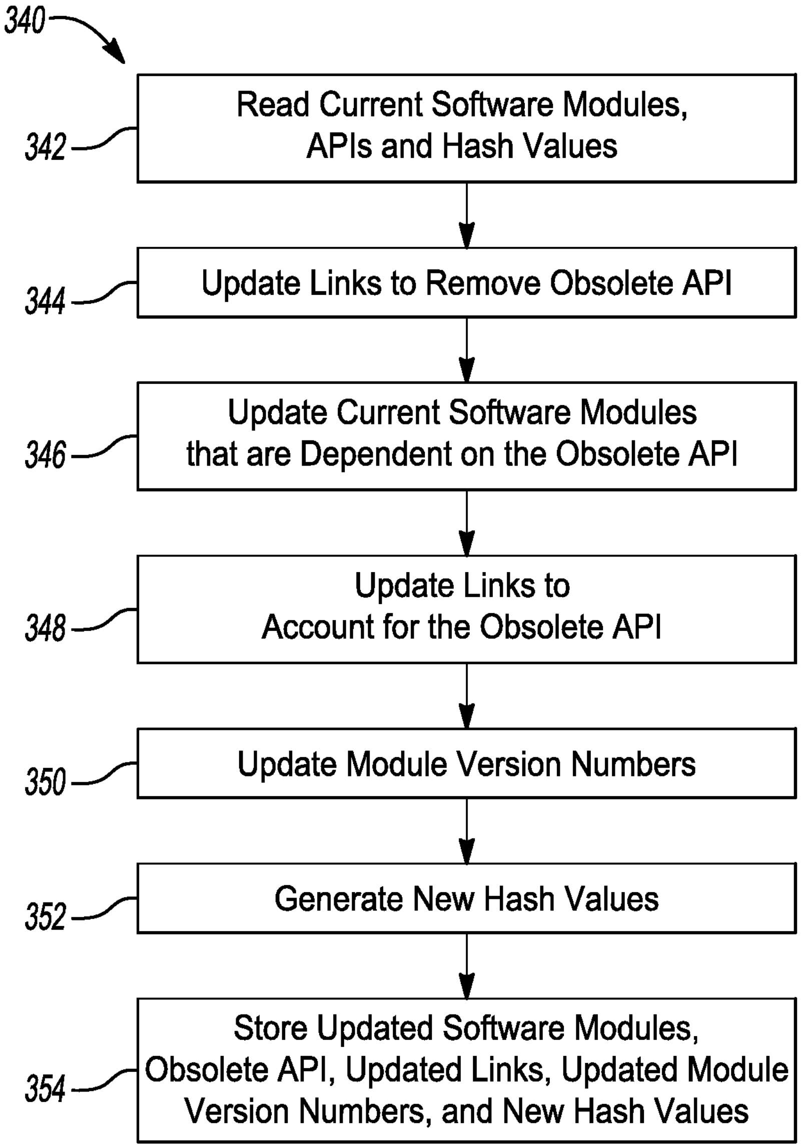
FIG. 13 is a flow diagram of a method for processing a major change in accordance with an exemplary embodiment.

Referring to FIG. 13, a flow diagram of an example method 340 for processing a major change is shown in accordance with an exemplary embodiment. The method (or process) 340 is implemented in the system 100. The method 340 includes a step 342, a step 344, a step 346, a step 348, a step 350, a step 352, and a step 354. The sequence of steps is shown as a representative example. Other step orders may be implemented to meet the criteria of a particular application.

In the step 342, the server computer 104 reads from the history log 106 the current software modules 126*a*-126*n*, the current application programming interfaces 120*a*-120*n* (including the obsolete descriptions of the obsolete application programming interfaces), and the hash value of the firmware program 98 currently installed in the target device 92. The links 122*a*-122*n* are updated in the step 344 by removing one or more current links for the obsolete application programming interfaces 120*a*-120*n* in the firmware program 98. In the step 346, the software modules 126*a*-126*n* that are dependent on the removed application programming interfaces are updated by the developer 96. The links 122*a*-122*n* are updated in the step 348 to account for the absence of the obsolete application programming interfaces 120*a*-120*n* and the updated software modules 126*a*-126*n*.

The version numbers are updated in the step 350. A new hash value is generated in the step 352. Thereafter, the updated software modules 126*a*-126*n*, the obsolete application programming interfaces 120*a*-120*n*, the updated links 122*a*-122*n*, the updated version numbers, and the new hash value are stored by appending the data to the history log 106 in the step 354.

In one or more embodiments, the method of tracking the history further includes appending one or more obsolete descriptions of one or more obsolete application programming interfaces to the plurality of current descriptions in the history log. The one or more obsolete application programming interfaces is one or more of the plurality of current application programming interfaces removed while generating the updated firmware program from the current firmware program. The method also includes reading the one or more obsolete descriptions of the one or more obsolete application programming interfaces from the history log, and generating the updated linkage for the updated firmware program by removing one or more current links for the one or more obsolete application programming interfaces.

In one or more embodiments, the method further includes preserving the plurality of current descriptions of the plurality of current application programming interfaces in the history log in response to the appending of the one or more new descriptions and the appending of the one or more obsolete descriptions.

In one or more embodiments, the method further includes patching a particular one of the plurality of current software modules. The patching includes updating the particular current software module, and preserving a particular one of the plurality of current descriptions that corresponds to the particular current software module.

In one or more embodiments, the method further includes patching an additional one of the plurality of current software modules that depends on one or more of the new application programming interfaces.

In one or more embodiments, the method further includes patching an additional one of the plurality of current software modules that depends on one or more of the obsolete application programming interfaces.

In one or more embodiments, the method further includes updating a particular one of the plurality of current software modules that solely depends on one or more of the obsolete application programming interfaces, and changing a linkage of a particular one of the plurality of current application programming interfaces that corresponds to the particular current software module.

In one or more embodiments, the method further includes identifying a change indicator for one of the plurality of current software modules, one of the plurality of current application programming interfaces, or both. The change indicator is one of a patch change, a minor change, or a major change. The method also includes storing the change indicator in the history log.

In one or more embodiments, the method further includes reading the change indicator from the history log. The generating of the updated linkage is based on the change indicator. The method also includes deploying the one or more updated software modules and the updated linkage to the target device.

In one or more embodiments, the method further includes accessing the updated firmware program. The updated firmware program includes one or more of the plurality of current software modules and one or more of the updated software modules. The method also includes reading one or more of the current descriptions of the one or more current application programming interfaces, reading the one or more new descriptions of the one or more new application programming interfaces from the history log, and accessing one or more changed software modules and one or more changed application programming interfaces of a changed firmware program. The changed firmware program is created from the updated firmware program. The method also includes appending one or more changed descriptions of the one or more changed application programming interfaces to the plurality of current descriptions in the history log.

In one or more embodiments of the system, the processor is further configured to append one or more obsolete descriptions of one or more obsolete application programming interfaces to the plurality of current descriptions in the history log. The one or more obsolete application programming interfaces is one or more of the plurality of current application programming interfaces removed while generating the updated firmware program from the current firmware program. The processor is also configured to read the one or more obsolete descriptions of the one or more obsolete application programming interfaces from the history log, and generate the updated linkage for the updated firmware program by removing one or more current links for the one or more obsolete application programming interfaces.

In one or more embodiments of the system, the processor is further configured to preserve the plurality of current descriptions of the plurality of current application programming interfaces in the history log in response to the appending of the one or more new descriptions and the appending of the one or more obsolete descriptions.

In one or more embodiments of the system, the processor is further configured to patch a particular one of the plurality of current software modules. The patching includes updating the particular current software module, and preserving a particular one of the plurality of current descriptions that corresponds to the particular current software module.

In one or more embodiments of the system, the processor is further configured to patch an additional one of the plurality of current software modules that depends on one or more of the new application programming interfaces.

In one or more embodiments of the system, the processor is further configured to patch an additional one of the plurality of current software modules that depends on one or more of the obsolete application programming interfaces.

In one or more embodiments of the system, the processor is further configured to update a particular one of the plurality of current software modules that solely depends on one or more of the obsolete application programming interfaces, and change a linkage of a particular one of the plurality of current application programming interfaces that corresponds to the particular current software module.

In one or more embodiments of the non-transitory computer readable storage medium, the plurality of operations further includes appending one or more obsolete descriptions of one or more obsolete application programming interfaces to the plurality of current descriptions in the history log. The one or more obsolete application programming interfaces is one or more of the plurality of current application programming interfaces removed while generating the updated firmware program from the current firmware program. The plurality of operations also includes reading the one or more obsolete descriptions of the one or more obsolete application programming interfaces from the history log, and generating the updated linkage for the updated firmware program by removing one or more current links for the one or more obsolete application programming interfaces.

In one or more embodiments of the non-transitory computer readable storage medium, the plurality of operations further includes preserving the plurality of current descriptions of the plurality of current application programming interfaces in the history log in response to the appending of the one or more new descriptions and the appending of the one or more obsolete descriptions.

While the best modes for carrying out the disclosure have been described in detail, those familiar with the art to which this disclosure relates will recognize various alternative designs and embodiments for practicing the disclosure within the scope of the appended claims.

What is claimed is:

1. A method of tracking a history of firmware program updates comprising:

reading a plurality of current descriptions of a plurality of current application programming interfaces from a history log, wherein the plurality of current application programming interfaces corresponds to a plurality of current software modules, and the plurality of current software modules forms a current firmware program of a target device;

accessing one or more updated software modules and one or more new descriptions of one or more new application programming interfaces of an updated firmware program, wherein the updated firmware program is created from the current firmware program;

appending the one or more new descriptions to the plurality of current descriptions in the history log using a processor;

reading the one or more new descriptions of the one or more new application programming interfaces from the history log using the processor;

generating an updated linkage for the updated firmware program by adding one or more new links for the one or more new application programming interfaces using the processor;

storing the one or more updated software modules and the updated linkage in the history log;

identifying a change indicator for one of the plurality of current software modules, one of the plurality of current application programming interfaces, or both, wherein the change indicator indicates which of a patch change, a minor change, or a major change has been applied to the one of the plurality of current software modules, the one of the plurality of current application programming interfaces, or both;

storing the change indicator in the history log;

reading the change indicator from the history log, wherein the generating of the updated linkage is based on the change indicator; and deploying the one or more updated software modules and the updated linkage to the target device.

2. The method according to claim 1, further comprising:

appending one or more obsolete descriptions of one or more obsolete application programming interfaces to the plurality of current descriptions in the history log, wherein the one or more obsolete application programming interfaces is one or more of the plurality of current application programming interfaces removed while generating the updated firmware program from the current firmware program;

reading the one or more obsolete descriptions of the one or more obsolete application programming interfaces from the history log; and generating the updated linkage for the updated firmware program by removing one or more current links for the one or more obsolete application programming interfaces.

3. The method according to claim 2, further comprising:

preserving the plurality of current descriptions of the plurality of current application programming interfaces in the history log in response to the appending of the one or more new descriptions and the appending of the one or more obsolete descriptions.

4. The method according to claim 2, further comprising:

patching a particular one of the plurality of current software modules, wherein the patching includes updating the particular current software module, and preserving a particular one of the plurality of current descriptions that corresponds to the particular current software module.

5. The method according to claim 4, further comprising:

patching an additional one of the plurality of current software modules that depends on one or more of the new application programming interfaces.

6. The method according to claim 4, further comprising:

patching an additional one of the plurality of current software modules that depends on one or more of the obsolete application programming interfaces.

7. The method according to claim 2, further comprising:

updating a particular one of the plurality of current software modules that solely depends on one or more of the obsolete application programming interfaces; and changing a linkage of a particular one of the plurality of current application programming interfaces that corresponds to the particular current software module.

8. The method according to claim 1, further comprising:

accessing the updated firmware program, wherein the updated firmware program includes one or more of the plurality of current software modules and one or more of the updated software modules;

reading one or more of the current descriptions of one or more of the plurality of current application programming interfaces, and the one or more new descriptions of the one or more new application programming interfaces from the history log;

accessing one or more changed software modules and one or more changed application programming interfaces of a changed firmware program, wherein the changed firmware program is created from the updated firmware program; and appending one or more changed descriptions of the one or more changed application programming interfaces to the plurality of current descriptions in the history log.

9. A system comprising:

a storage device configured to store a history log; and a processor coupled to the storage device and configured to:

read a plurality of current descriptions of a plurality of current application programming interfaces from the history log, wherein the plurality of current application programming interfaces corresponds to a plurality of current software modules, and the plurality of current software modules forms a current firmware program of a target device;

access one or more updated software modules and one or more new descriptions of one or more new application programming interfaces of an updated firmware program, wherein the updated firmware program is created from the current firmware program;

append the one or more new descriptions to the plurality of current descriptions in the history log;

read the one or more new descriptions of the one or more new application programming interfaces from the history log;

generate an updated linkage for the updated firmware program by adding one or more new links for the one or more new application programming interfaces;

store the one or more updated software modules and the updated linkage in the history log;

identify a change indicator for one of the plurality of current software modules, one of the plurality of current application programming interfaces, or both, wherein the change indicator indicates which of a patch change, a minor change, or a major change has been applied to the one of the plurality of current software modules, the one of the plurality of current application programming interfaces, or both;

store the change indicator in the history log;

read the change indicator from the history log, wherein the generating of the updated linkage is based on the change indicator; and deploy the one or more updated software modules and the updated linkage to the target device.

10. The system to claim 9, wherein the processor is further configured to:

append one or more obsolete descriptions of one or more obsolete application programming interfaces to the plurality of current descriptions in the history log, wherein the one or more obsolete application programming interfaces is one or more of the plurality of current application programming interfaces removed while generating the updated firmware program from the current firmware program;

read the one or more obsolete descriptions of the one or more obsolete application programming interfaces from the history log; and generate the updated linkage for the updated firmware program by removing one or more current links for the one or more obsolete application programming interfaces.

11. The system according to claim 10, wherein the processor is further configured to preserve the plurality of current descriptions of the plurality of current application programming interfaces in the history log in response to the appending of the one or more new descriptions and the appending of the one or more obsolete descriptions.

12. The system according to claim 10, wherein the processor is further configured to patch a particular one of the plurality of current software modules, wherein the patching includes updating the particular current software module, and preserving a particular one of the plurality of current descriptions that corresponds to the particular current software module.

13. The system according to claim 12, wherein the processor is further configured to patch an additional one of the plurality of current software modules that depends on one or more of the new application programming interfaces.

14. The system according to claim 12, wherein the processor is further configured to patch an additional one of the plurality of current software modules that depends on one or more of the obsolete application programming interfaces.

15. The system according to claim 10, wherein the processor is further configured to:

update a particular one of the plurality of current software modules that solely depends on one or more of the obsolete application programming interfaces; and change a linkage of a particular one of the plurality of current application programming interfaces that corresponds to the particular current software module.

16. A non-transitory, computer-readable storage medium storing instructions that track a history of firmware updates, the instructions, when executed by a processor, cause the processor to perform a plurality of operations comprising:

reading a plurality of current descriptions of a plurality of current application programming interfaces from a history log, wherein the plurality of current application programming interfaces corresponds to a plurality of current software modules, and the plurality of current software modules forms a current firmware program of a target device;

accessing one or more updated software modules and one or more new descriptions of one or more new application programming interfaces of an updated firmware program, wherein the updated firmware program is created from the current firmware program;

appending the one or more new descriptions to the plurality of current descriptions in the history log;

reading the one or more new descriptions of the one or more new application programming interfaces from the history log;

generating an updated linkage for the updated firmware program by adding one or more new links for the one or more new application programming interfaces;

storing the one or more updated software modules and the updated linkage in the history log;

identifying a change indicator for one of the plurality of current software modules, one of the plurality of current application programming interfaces, or both, wherein the change indicator indicates which of a patch change, a minor change, or a major change has been applied to the one of the plurality of current software modules, the one of the plurality of current application programming interfaces, or both;

storing the change indicator in the history log;

reading the change indicator from the history log, wherein the generating of the updated linkage is based on the change indicator; and deploying the one or more updated software modules and the updated linkage to the target device.

17. The non-transitory computer readable storage medium according to claim 16, wherein the plurality of operations further comprises:

appending one or more obsolete descriptions of one or more obsolete application programming interfaces to the plurality of current descriptions in the history log, wherein the one or more obsolete application programming interfaces is one or more of the plurality of current application programming interfaces removed while generating the updated firmware program from the current firmware program;

reading the one or more obsolete descriptions of the one or more obsolete application programming interfaces from the history log; and generating the updated linkage for the updated firmware program by removing one or more current links for the one or more obsolete application programming interfaces.

18. The non-transitory computer readable storage medium according to claim 17, wherein the plurality of instructions further comprises:

preserving the plurality of current descriptions of the plurality of current application programming interfaces in the history log in response to the appending of the one or more new descriptions and the appending of the one or more obsolete descriptions.

* * * * *